United States Patent
Bowen

(10) Patent No.: US 9,215,231 B1
(45) Date of Patent: Dec. 15, 2015

(54) USING A FRAUD METRIC FOR PROVISIONING OF DIGITAL CERTIFICATES

(71) Applicant: Amazon Technologies, Inc., Reno, NV (US)

(72) Inventor: Peter Zachary Bowen, Bainbridge Island, WA (US)

(73) Assignee: Amazon Technologies, Inc., Seattle, WA (US)

(*) Notice: Subject to any disclaimer, the term of this patent is extended or adjusted under 35 U.S.C. 154(b) by 11 days.

(21) Appl. No.: 14/189,231

(22) Filed: Feb. 25, 2014

(51) Int. Cl.
*H04L 29/06* (2006.01)

(52) U.S. Cl.
CPC .................................. *H04L 63/0823* (2013.01)

(58) Field of Classification Search
CPC .................................................... H04L 63/0823
USPC ........................................................ 713/156
See application file for complete search history.

(56) References Cited

U.S. PATENT DOCUMENTS

| | | | |
|---|---|---|---|
| 7,484,089 | B1 | 1/2009 | Kogen et al. |
| 8,249,654 | B1* | 8/2012 | Zhu .............................. 455/558 |
| 8,473,735 | B1 | 6/2013 | Jarvie et al. |
| 8,805,971 | B1* | 8/2014 | Roth et al. ..................... 709/220 |
| 2003/0041091 | A1* | 2/2003 | Cheline et al. ................ 709/200 |
| 2005/0138388 | A1 | 6/2005 | Paganetti et al. |
| 2006/0002556 | A1* | 1/2006 | Paul .............................. 380/270 |
| 2007/0234040 | A1* | 10/2007 | Hurst et al. .................... 713/156 |
| 2008/0114984 | A1* | 5/2008 | Srinivasan et al. ............ 713/175 |
| 2009/0141707 | A1* | 6/2009 | Kavanaugh .................... 370/352 |
| 2011/0161662 | A1 | 6/2011 | Lee et al. |
| 2011/0214124 | A1 | 9/2011 | Ferris et al. |
| 2011/0282943 | A1* | 11/2011 | Anderson et al. ............. 709/204 |
| 2012/0179907 | A1* | 7/2012 | Byrd et al. ..................... 713/156 |
| 2013/0238895 | A1 | 9/2013 | Dixon et al. |
| 2013/0311771 | A1* | 11/2013 | Hoggan ........................ 713/156 |

OTHER PUBLICATIONS

Wikipedia, "Certificate Authority," Wikipedia.com, last modified Dec. 30, 2013, accessed Jan. 6, 2014, 7 pages.
Wikipedia, "Digital Signature," Wikipedia.com, last modified Jan. 3, 2014, accessed Jan. 6, 2014, 10 pages.
Wikipedia, "Public-key Cryptography," Wikipedia.com, last modified Jan. 6, 2014, accessed Jan. 6, 2014, 12 pages.

(Continued)

*Primary Examiner* — Michael S McNally
(74) *Attorney, Agent, or Firm* — Klarquist Sparkman, LLP

(57) ABSTRACT

A method for provisioning digital certificates in a multi-tenant network environment may include receiving an API request for a digital certificate from a representative of a customer entity. Existing account information of the representative may be retrieved, the existing account information associated with at least one service provided within the multi-tenant network environment and used by the representative. The identity of the representative may be verified based at least in part on digital certificate authentication information within the API request. At least one fraud metric may be generated for the representative based on the retrieved existing account information. The at least one fraud metric may be indicative of fraudulent activity associated with the representative. The identity verification and the at least one fraud metric may be used to determine whether to issue the digital certificate to the customer entity.

20 Claims, 10 Drawing Sheets

(56) References Cited

OTHER PUBLICATIONS

International Search Report dated Jun. 3, 2015, from corresponding International Application No. PCT/US2015/017232, 2 pages.

Written Opinion dated Jun. 3, 2015, from corresponding International Application No. PCT/US2015/017232, 7 pages.

* cited by examiner

USING A FRAUD METRIC FOR PROVISIONING OF DIGITAL CERTIFICATES

BACKGROUND

Cloud computing is the use of computing resources (hardware and software) that are available in a remote location and accessible over a network, such as the Internet. In a computing environment with many computing devices, such as a virtual server or cloud computing environment with many server computers, the use of computing resources can provide a number of advantages including cost advantages and/or the ability to adapt rapidly to changing computing resource needs. Additionally, secure communications in the cloud computing environment are an important consideration as they ensure authentication of the communicating parties, as well as integrity and security of the communication itself. However, the setup of secure communications can be a difficult task for the communicating parties in the cloud computing environment.

For example, entity authentication within the cloud computing environment may be based on digital certificates, which may have to be issued to multiple parties. The digital certificates are typically issued by a Certificate Authority (CA) in exchange for a fee and after the CA has completed an extensive and time-consuming authentication process. Once issued, the digital certificates can be used without any additional interaction with (or authentication by) the CA, which, in the case of extended validation certificates, can be a long period of time. Therefore, not only is the process of obtaining digital certificates time-consuming, but issuing certificates for an extended period of time may lead to unauthorized use of the certificates causing security breaches in the cloud computing environment.

BRIEF DESCRIPTION OF THE DRAWINGS

Various embodiments in accordance with the present disclosure will be described with reference to the drawings, in which.

DETAILED DESCRIPTION

Figure 1:
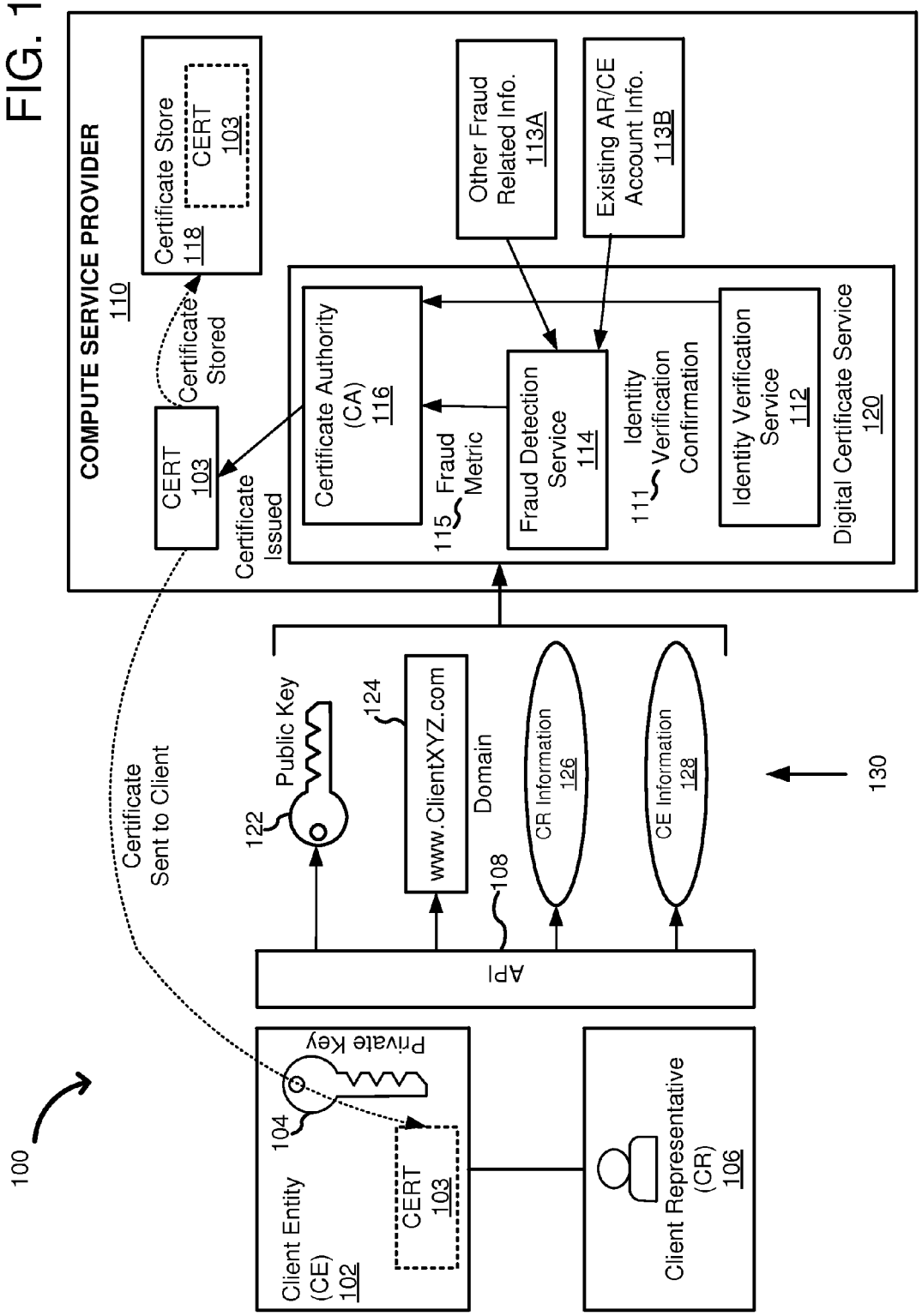
FIG. 1 is a diagram of an example network environment supporting using a fraud metric for provisioning of digital certificates, in accordance with an embodiment of the disclosure.

A virtual machine image contains an operating system (e.g., Linux) and other data needed to launch a virtual machine in a virtual environment. The virtual machine image is similar to a physical computer's disk volume, and may include a file system, the operating system and other components needed to boot up as a machine. In order to launch a virtual machine, hardware needs to be selected. The hardware selection may be accomplished through instance types, which may allow a variety of different sizes of memory, CPU capacity, I/O performance, and so forth. The combination of the virtual machine image and the instance type can be used to create an "instance" or a virtual machine, which may be launched on a cloud computing resource, such as a host server computer in a multi-tenant network environment.

The following description is directed to techniques and solutions supporting using a fraud metric for provisioning of digital certificates in a network environment, such as a cloud computing multi-tenant network environment. A customer entity may request a digital certificate by communicating a Certificate Signing Request (CSR) to a Certificate Authority (CA). The CA may perform identity and other verification of the requesting customer entity (and/or a customer entity representative submitting the CSR), and information the customer entity is seeking to assert and get authorized by the CA (e.g., the domain name of the customer entity, identity of an officer of the customer entity requesting the certificate, customer entity address, authenticity of a public key of an asymmetric public-private key pair of the customer entity, and so forth). In this regard, the CA may require proof of ownership of the domain and identity of the domain owner (e.g., the customer entity) as well as the identity of the corporate officer (or employee/representative) requesting the certificate.

The CA authentication process may also be supplemented by a fraud detection service when making a decision on whether or not to issue a certificate to a customer entity in the multi-tenant network environment. More specifically, after the identity of the customer entity (and/or the representative) is verified, a fraud metric (or score) may be determined for the customer entity (and/or a representative of the customer entity requesting the certificate). The determination of the fraud metric may be based on existing account information associated with the customer entity (and/or the representative) in connection with one or more services offered within the in the multi-tenant network environment and used by the customer entity (and/or the representative). In some instances, the fraud metric may be indicative of prior fraud (or a possibility of future fraud) in connection with usage of the one or more services by the customer entity (and/or the representative of the customer entity).

Once the CA has completed the authentication process and the fraud metric is determined to be within an acceptable range, the CA may issue a digital certificate associating the requesting customer entity with the public key and the requested domain. The digital certificate is also cryptographically signed by the issuing CA (e.g., using a private key of the CA), and can be traced through a hierarchy of CAs to a CA that is known and trusted. Typically, a digital certificate has an expiration date, at which point the customer entity may need to apply again (and pay a fee) for reissuing the certificate. After issuance, the digital certificate can be used in the cloud computing multi-tenant network environment (as well as other Internet-based communications) to establish the identity of the customer entity and/or authenticity of one or more web sites or other network resources or services associated with the customer entity. Flexibility and reliability of digital certificate issuance and management may be improved by, for example, implementing the CA (as well as the identity verification and fraud detection service) as part of the multi-tenant network environment.

As used herein, the term "provisioning a digital certificate" means enabling and providing a digital certificate-related service to a customer, which may include authorizing the customer to have a digital certificate, verifying customer's identity, verifying the identity of a representative of the customer applying for a digital certificate, issuing the digital certificate to the customer, and/or managing the digital certificate after issuance (e.g., renewing, reissuing and/or revoking the digital certificate).

FIG. 1 is a diagram of an example network environment supporting using a fraud metric for provisioning of digital certificates, in accordance with an embodiment of the disclosure. Referring to FIG. 1, the network environment 100 may comprise a customer entity (CE) 102, a customer representative (CR) 106, and a compute service provider (CSP) 110. The compute service provider 110 may be, for example, a cloud provider that is capable of delivery of computing and storage capacity as a service to a community of end recipients (e.g., tenants or customers), such as the customer entity 102. The compute service provider 110 may comprise a digital certificate service 120 and a certificate store 116. The digital certificate service 120 may comprise a certificate authority (CA) 116, a fraud detection service 114, and an identity verification service 112, and may be used to provide various digital certificate-related functionalities.

The CA 116 may comprise suitable circuitry, logic, and/or code and may be implemented as part of the digital certificate service 120 within the compute service provider 110 to handle the issuance and management (e.g., reissuance and/or revocation) of digital certificates. Even though the CA 116 is implemented as part of the computer service provider 110, in other implementations the CSP 110 may use the services of a CA that is implemented separately from the CSP 110.

The identity verification service 112 may comprise suitable logic, circuitry, interfaces, and/or code and may be operable to provide one or more identity verification confirmations (e.g., 111) in connection with issuance of digital certificates by the CA 116. For example, the identity verification service 112 may be operable to verify the corporate identity of the customer entity 102 (e.g., customer entity 102 is registered at the corporate address provided with the digital certificate application, the customer entity 102 is the registered legal owner of the domain name the digital certificate will be for, and so forth).

The fraud detection service 114 may comprise suitable logic, circuitry, interfaces, and/or code and may be operable to generate one or more fraud metrics (e.g., 115) in connection with issuance of digital certificates by the CA 116. For example, the fraud detection service 114 may use information 130 provided in connection with a Certificate Signing Request, existing account information 113B for the CE 102 (and/or the CR 106), and/or other fraud related information 113A to assess fraud-related risks associated with the CE 102 and/or the CR 106. As a result, the fraud detection service 114 may generate the fraud metric 115, which may be used by the CA 116 for denying or approving the issuance of the requested digital certificate.

In operation, the customer entity 102 (e.g., CR 106) may use an application programming interface (API) 108 to send CSR information 130 to the digital certificate service 120 within the CSP 110. The CSR information may comprise a public key 122 (corresponding to the private key 104 retained by CE 102), domain name 124 (to be associated with the requested digital certificate), and CR information 126 (and/or CE information 128). The CR information 126 may include information associated with the customer representative 106, such as account login information (for logging in and accessing one or more service offered by the CSP 110), user email information, user name, and so forth. The CE information 128 may include information associated with the customer entity 102, such as corporate name, address, and so forth.

After the CSR information 130 is communicated to the digital certificate service 120, the identity verification service 112 may use the CSR information to perform identity verification and validation in connection with the requested digital certificate. For example, the identity verification may include bottom-end validation by obtaining the registered email address for the requested domain 124 and communicating a validation email request to the registered email address. The CE 102 will be considered validated upon receipt of an email response to the validation email. The identity verification may also include organizational validation, which may be performed by not only validating the email of record but also validating that the corporate entity registered for the requested domain name 124 is the same entity as the requesting CE 102.

The identity verification service 112 may further perform extended validation by establish the legal identity as well as the operational and physical presence of the website owner for the requested domain 124, by establishing that the applicant (e.g., the CE 102 and/or the CR 106) is the domain name (124) owner or has exclusive control over the domain name 124, and/or by confirming the identity and authority of the representative (e.g., CR 106) acting for the website owner (e.g., CE 102), and that documents pertaining to legal obligations are signed by an authorized officer of the CE 102. Upon completion of the identity verification, an identity verification confirmation 111 may be communicated to the CA 116.

The fraud detection service 114 may use information 130 provided in connection with a Certificate Signing Request, existing account information 113B for the CE 102 (and/or the CR 106), and/or other fraud related information 113A to assess fraud-related risks associated with the CE 102 and/or the CR 106. As a result, the fraud detection service 114 may generate the fraud metric 115, which may indicative of fraud related activities associated with the CE 102 and/or the CR 106. The fraud metric 115 may be communicated to the CA 116, and may be used by the CA 116 together with the identity verification confirmation 111 to deny or approve the issuance of the requested digital certificate. For example, if the identity verification confirmation 111 indicates a confirmed identity for the CE 102 and/or the CR 106 and the fraud metric 115 is below a threshold value, then the CA may generate the certificate 103 associated with the key 122 and the domain name 124. After the certificate 103 is generated, it may be stored within a network resource 119 that is being used by the customer entity 102, communicated to the customer entity 102 and/or it may be stored within the certificate store 118.

Figure 2:
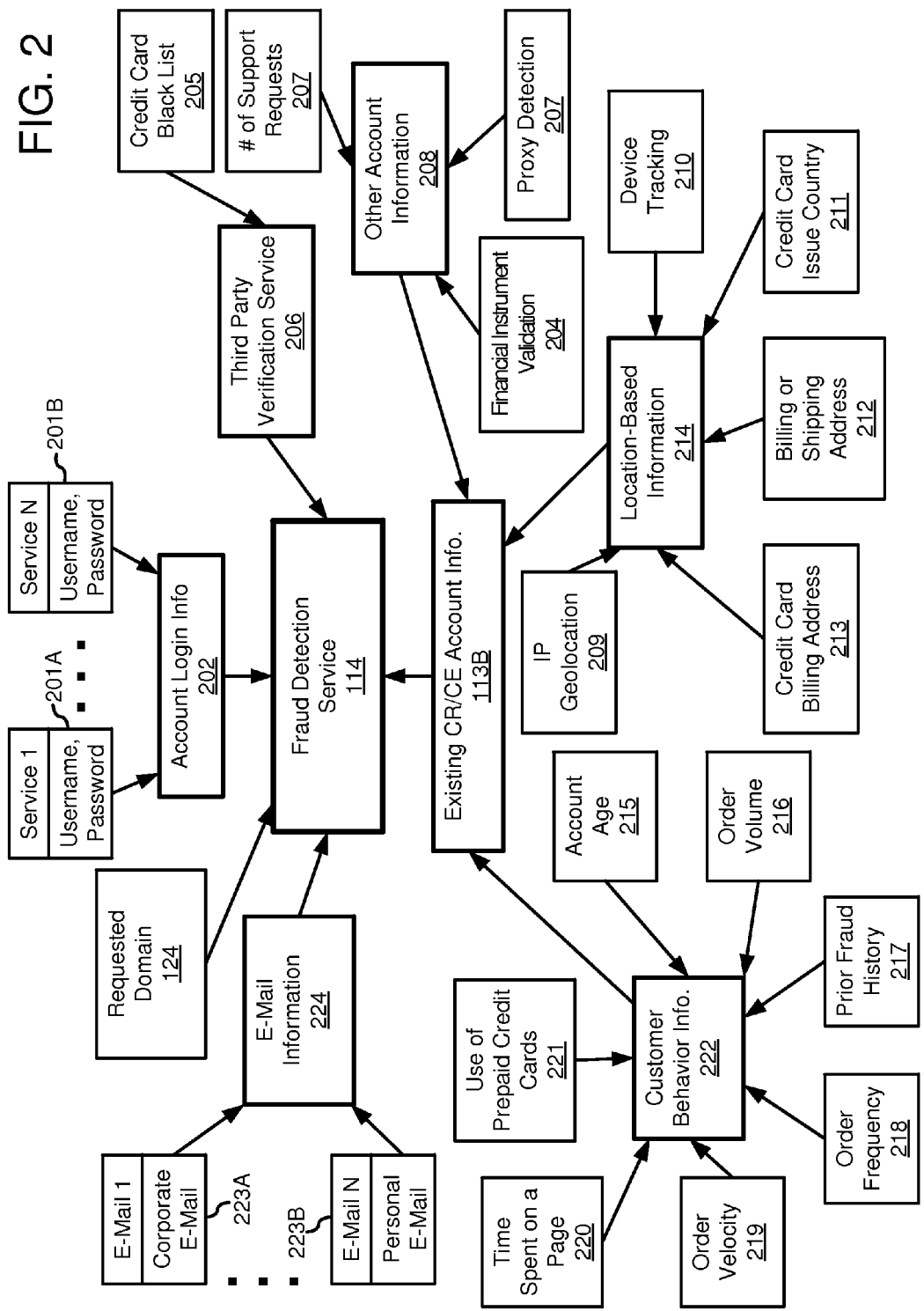
FIG. 2 is a block diagram of an example fraud detection service, which can be used in connection with provisioning of digital certificates, in accordance with an embodiment of the disclosure.

FIG. 2 is a block diagram of an example fraud detection service, which can be used in connection with provisioning of digital certificates, in accordance with an embodiment of the disclosure. Referring to FIG. 2, the fraud detection service 114 may be configured to receive a variety of information, which may be used for generating the fraud metric 115. For example, the fraud detection service 114 may receive account login information 202 and email information 224 as part of the CR information 126 and/or CE information 128 associated with the received CSR information 130. The account login information 202 may include user name-password combinations 201A, . . . , 201B for logging into and using a plurality of services (service 1, . . . , service N) provided by the CSP 110. For example, such services may include a merchandizing/retail type of service, a payment management service, a cloud storage service, and so forth. The email information 224 may include one or more emails 223A, . . . , 223B, which may be corporate and/or personal emails.

The fraud detection service 114 may also use existing CR/CE account information 113B associated with one or more services offered by the CSP 110. The existing account information 113B may include historic account information (e.g., associated with prior transactions) of the CE 102 or the CR 106 in relation to one or more services that have been previously (or currently) used by the CE 102 or the CR 106. The existing account information 113B may comprise, for example, customer behavior information 222, location-based information 214, and other account information 208.

The customer behavior information 222 may comprise, for example, the following information:
  Information 220 on time spent on a particular web page (e.g., repeat use of a payment processing page may indicate attempt for fraudulent payment);
  Information 221 on use of prepaid credit cards (using such payment instruments is often indicative of fraudulent payment/order);
  Account age information 215 (a user with a well-established account may be associated with lower fraud risk than a user with a newly-established account);
  Order velocity information 219 (a user that takes extremely long time to place/process an order may indicate multiple unsuccessful attempts for fraudulent payment);
  Order frequency information 218 and order volume information 216 (a user who has used the account for occasional order placement may have a higher fraud risk compared to a user that orders frequently and has a well-established account history); and
  Prior fraud history 217 (such information will indicate a higher probability of fraud in the current transaction, i.e., obtaining a digital certificate).

The location-based information 214 may comprise, for example, the following information:
  Credit card billing address information 213 and billing/shipping address information 212 provided by the CE 102 or the CR 106. A comparison may be performed between the numeric address data in information 213 and 212, and potential for fraud may be indicated (e.g., fraud metric increased) if there is a history of (or currently) the numeric address data in 213 and 212 does not match.
  Credit card issue country information 211—credit cards issued by certain countries may be flagged as being associated with history of fraudulent transactions. Additionally, the credit card issue country information 211 may be compared against information 213, 212, and/or 209 to verify that the country information matches.
  Device tracking information 210 (placing orders from a previously unknown location may indicate fraud); and
  IP geolocation information 209. IP geolocation may be used to determine the current geographic location of a network device being used by a customer based on the IP address of the device. Fraud potential may be indicated if, for example, the country associated with the IP address does not match the country associated with information 211, 212, and/or 213.

The other account information 208 may include, for example, the following information:
  Proxy detection information 207, which may be used to detect whether the use is using an anonymizer or a proxy server in order to hide their true IP address and location.
  Financial instrument validation information 204, which may include, for example, the following: information on whether one or more financial instruments associated with a customer account have been (or currently are) valid to collect payment for a transaction; information on whether one or more financial instruments associated with a customer have been (or currently are) registered in a name associated with a valid customer account with the CSP 110; information on whether an address associated with a customer account matches with at least part of an address stored by a financial service provider corresponding to one or more financial instruments associated with the customer; and information on whether a customer has instructed a financial service provider corresponding to any of a plurality of financial instruments to block online transactions using the financial instrument; and
  Information 207 on a number of support requests initiated by a customer (a customer who has requested support for a given account indicates higher probability that the account indeed belongs to the customer and, therefore, lower probability of fraud is associated with it).

The fraud detection service 114 may also use a third party verification service 206, which may provide additional information for fraud assessment risk. Such information may include, for example, a credit card "black list" 205, which may list currently revoked/stolen/unauthorized credit cards.

Even though only a limited number of fraud-related information categories are listed in FIG. 2, the disclosure is not limited in this regard and other types of information may also be used for assessing fraud associated with the CE 102 and/or the CR 106. The fraud detection service may consider one or more of the types of information discussed above and may assign, for example, weight values to each information considered so as to calculate a total fraud metric associated with the CE 102 and/or the CR 106 for purposes of allowing or denying the issuance of the requested digital certificate.

Here are several non-limiting examples of how a fraud metric may be calculated:

EXAMPLE 1

The CR 106 requests the digital certificate for a customer entity (e.g., 102) domain 124, which may be www.CustomerXYZ.com. The CR information 126 associated with the CSR information 130 may include the email of the CR 106, which may be john@CustomerXYZ.com. The fraud detection service 114 may assign a lower weight value to the fraud metric since the domain 124 matches the CR's email domain. Additionally, john@CustomerXYZ.com may also have an established account with the CSP 110 for purposes of, for example, retail purchases (e.g., CSP 110 provides online retail/merchandising services). The fraud detection service 114 may locate CR's account based on CR's email john@CustomerXYZ.com, and may access historic account information. For example, the fraud detection service 114 may determine that the credit card issue country 211 and the shipping address 212 match the CE's country and address of record associated with the domain registration for the requested domain 124. Overall, a very low fraud metric 115 may be assigned and issuance of the certificate 103 to the requesting CR 106 may be approved.

EXAMPLE 2

The CR 106 requests the digital certificate for a customer entity (e.g., 102) domain 124, which may be www.CustomerXYZ.com. The CR information 126 associated with the CSR information 130 may include the email of the CR 106, which may be john@CustomerXYZ.com. The fraud detection service 114 may assign a lower weight value to the fraud metric since the domain 124 matches the CR's email domain. Additionally, john@CustomerXYZ.com may also have an established account with the CSP 110 for purposes of, for example, retail purchases (e.g., CSP 110 provides online retail/merchandizing services). The fraud detection service 114 may locate CR's account based on CR's email john@CustomerXYZ.com, and may access historic account information. For example, the fraud detection service 114 may determine that CR's account is newly established (e.g., information 215) and has multiple purchases with a pre-paid credit card (information 221). The fraud detection service 114 may then assign a higher fraud metric 115 and issuance of the certificate 103 to the requesting CR 106 may be denied.

Figure 3:
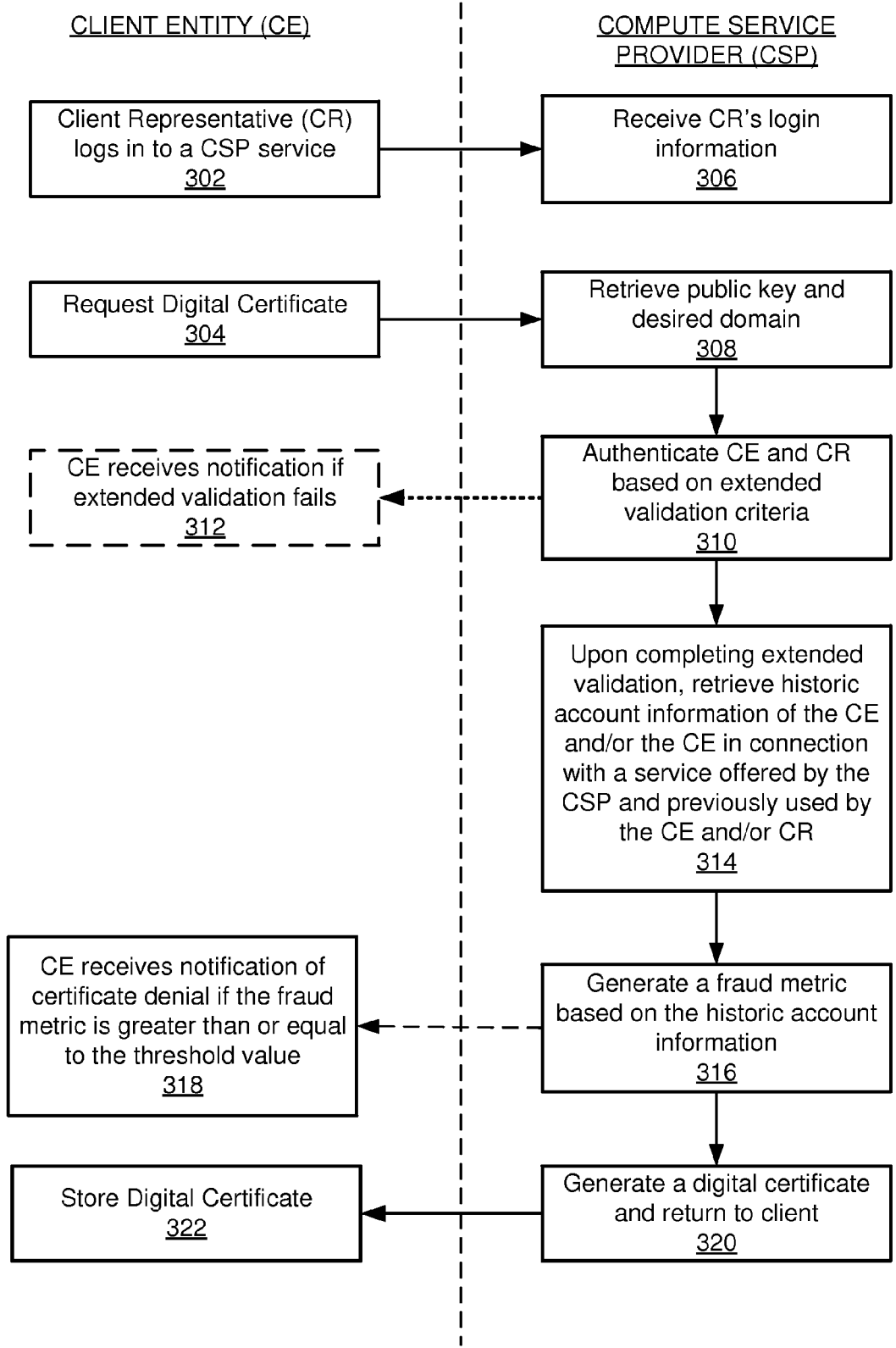
FIG. 3 is a flow diagram illustrating provisioning of digital certificates to a customer entity in a network environment, in accordance with various embodiments of the disclosure.

FIG. 3 is a flow diagram illustrating provisioning of digital certificates to a customer entity in a network environment, in accordance with various embodiments of the disclosure. Referring to FIGS. 1 and 3, there are illustrated actions that may be performed by the customer entity 104 (on the left side of the page) and actions that may be performed by the compute service provider 110 (on the right side of the page) in connection with provisioning of digital certificates.

An action 302 may indicate that the CR 106 has logged in to a service provided by the CSP 110. For example, the CR 106 may log in to a cloud storage service provided by the CSP 110. Action 306 may indicate that the CSP 110 has received the login information (e.g., CR information 126 and/or CE information 128, which may include user name and password to access the cloud storage service of the CSP 110).

An action 304 may comprise requesting (by the customer entity 102 or the CR 106) a digital certificate. In this regard, the CE 102 or the CR 106 may use an API request to communicate CSR information 130, such as the domain 124 and the public key 122 which will be associated with the certificate. At 308, the CSP 110 may receive the CSR information 130, and the digital certificate service 114 may retrieve the public key 122 and the domain 124. Additionally, the digital certificate service may also retrieve the CR information 126 and/or the CE information 128, which may be used by the fraud detection service 114 for generating the fraud metric 115.

At 310, the identity verification service 112 within the digital certificate service 310 may perform, for example, an extended validation and authenticate the identity of the CE 102 and/or the CR 106. The identity verification service 112 may perform an extended validation by establishing the legal identity as well as the operational and physical presence of the website owner for the requested domain 124, by establishing that the applicant (e.g., the CE 102 and/or the CR 106) is the domain name (124) owner or has exclusive control over the domain name 124, and/or by confirming the identity and authority of the representative (e.g., CR 106) acting for the website owner (e.g., CE 102), and that documents pertaining to legal obligations are signed by an authorized officer of the CE 102.

At 314, upon completing the extended validation (and generating an identity verification confirmation 111) by the identity verification service 112, the fraud detection service 114 may retrieve existing/historic account information (e.g., 113B and as illustrated in FIG. 2) of the CE 102 and/or the CR 106 in connection with a service offered by the CSP 110 and previously used by the CE 102 and/or the CR 106 (e.g., the cloud storage service used by the CR 106). At 316, the fraud detection service 114 may generate the fraud metric 115 based on the historic account information (e.g., as explained above in reference to FIG. 2).

If the fraud metric 115 is greater than or equal to a threshold value, then at 320, the CE 102 and/or the CR 106 may receive a notification of denial of issuance of the requested digital certificate. If the fraud metric 115 is less than the threshold value, then at 320, the CA 116 may use the CSR information 130 (including the generated private/public key pair 122/104) to generate a digital certificate (e.g., certificate 103) for use by the customer entity 102 and/or the CR 106 in connection with the domain 124. The digital certificate may be issued for a short (fixed) duration and may additionally identify the domain 124 it will be used for, or a specific network resource being used, controlled and/or paid for by the customer (or another network resource that the customer needs certificate for). The generated certificate 103 may be additionally signed by the CA 116 (e.g., by a private key of the CA 116) to further authenticate the certificate.

At 322, the issued digital certificate (e.g., 103) may be returned to the customer entity 102 and/or the CR 106 and may be stored (e.g., at a local certificate store managed by the customer entity 102).

Figure 4:
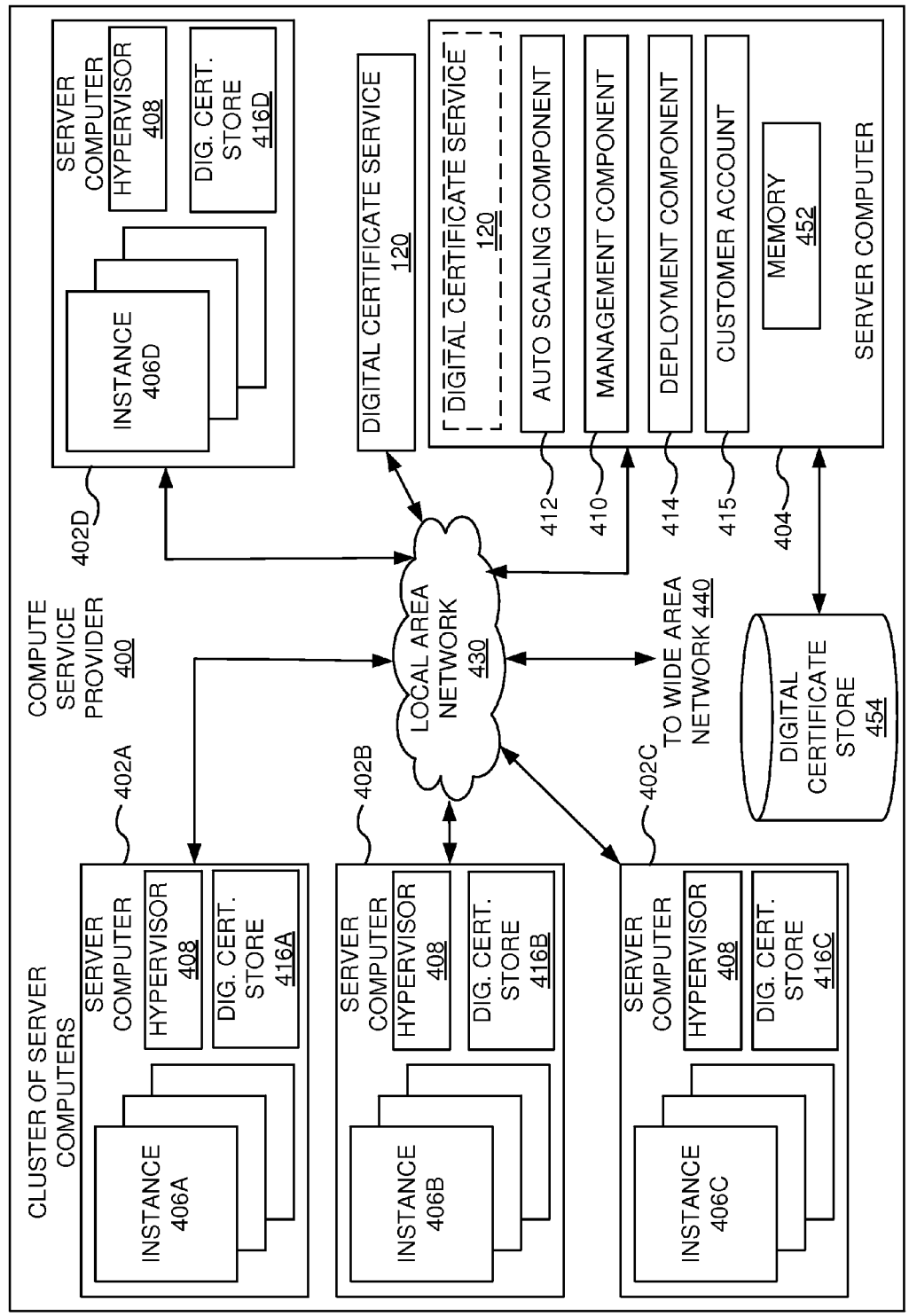
FIG. 4 is an example system diagram showing a plurality of virtual machine instances running in a multi-tenant environment, using a digital certificate service, in accordance with an example embodiment of the disclosure.

FIG. 4 is an example system diagram showing a plurality of virtual machine instances running in a multi-tenant environment, using a digital certificate service, in accordance with an example embodiment of the disclosure. More specifically, FIG. 4 is a computing system diagram of a network-based compute service provider 400 that illustrates one environment in which embodiments described herein can be used. By way of background, the compute service provider 400 (i.e., the cloud provider) is capable of delivery of computing and storage capacity as a service to a community of end recipients (e.g., tenants or customers).

In an example embodiment, the compute service provider 400 can be established for an organization by or on behalf of the organization. That is, the compute service provider 400 may offer a "private cloud environment." In another embodiment, the compute service provider 400 supports a multi-tenant environment, wherein a plurality of customers operate independently (i.e., a public cloud environment). Generally speaking, the compute service provider 400 can provide the following models: Infrastructure as a Service ("IaaS"), Platform as a Service ("PaaS"), and/or Software as a Service ("SaaS"). Other models can be provided. For the IaaS model, the compute service provider 500 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software.

The SaaS model allows installation and operation of application software in the compute service provider. In some embodiments, end users access the compute service provider 400 using networked customer devices, such as desktop computers, laptops, tablets, smartphones, etc. running web browsers or other lightweight customer applications. Those skilled in the art will recognize that the compute service provider 500 can be described as a "cloud" environment.

The particular illustrated compute service provider 400 includes a plurality of server computers 402A-402D. While only four server computers are shown, any number can be used, and large centers can include thousands of server computers. The server computers 402A-402D can provide computing resources for executing software instances 406A-406D. In one embodiment, the instances 406A-406D are virtual machines. As known in the art, a virtual machine is an instance of a software implementation of a machine (i.e., a computer) that executes applications like a physical machine. In the example, each of the server computers 402A-402D can be configured to execute a hypervisor 408 or another type of program configured to enable the execution of multiple instances 406 on a single server. For example, each of the servers 402A-402D can be configured (e.g., via the hypervisor 408) to support one or more virtual machine partitions, with each virtual machine partition capable of running a virtual machine instance (e.g., server computer 402A could be configured to support three virtual machine partitions each running a corresponding virtual machine instance). Additionally, each of the instances 406 can be configured to execute one or more applications.

In an example embodiment, each of the server computers 402A-402D may also comprise a digital certificate store (416A-416D) communicatively coupled to the network 430. The digital certificate store 416 may comprise suitable circuitry, logic, and/or code and may be operable to store one or more digital certificates that have been issued in connection with at least one instance running on a corresponding server computer 402.

The compute service provider 400 may also comprise a digital certificate service 120. The digital certificate service 120 may comprise suitable circuitry, logic, and/or code and may be operable to perform the functionalities described herein (e.g., in reference to FIGS. 1-3) including identity verification/validation and fraud detection in connection with issuing digital certificates, as well as issue, renew and/or revoke digital certificates in connection with one or more of the network resources (e.g., instances 406 and/or other services associated with the server computers 402) of the provider 400. In this regard, the digital certificate service 120 may implement one or more of the functionalities described herein that are performed by the identity verification service 112, the fraud detection service 114, and/or the CA 116 (in FIG. 1). Digital certificates (e.g., 103) that have been generated and managed by the digital certificate service 120 may be communicated to a corresponding server computer 402 that is associated with the network resource (e.g., an instance 406) and/or a domain name (e.g., 124) the certificate is tied to. The digital certificate may then be stored locally, by the digital certificate store 416 of the corresponding server computer 402. As an alternative, the generated digital certificate may also be stored by the digital certificate store 454 associated with the managing server computer 404, and communicated to the corresponding server computer as needed (e.g., upon request by a customer entity that is using, controlling, and/or paying for an instance).

Figure 5:
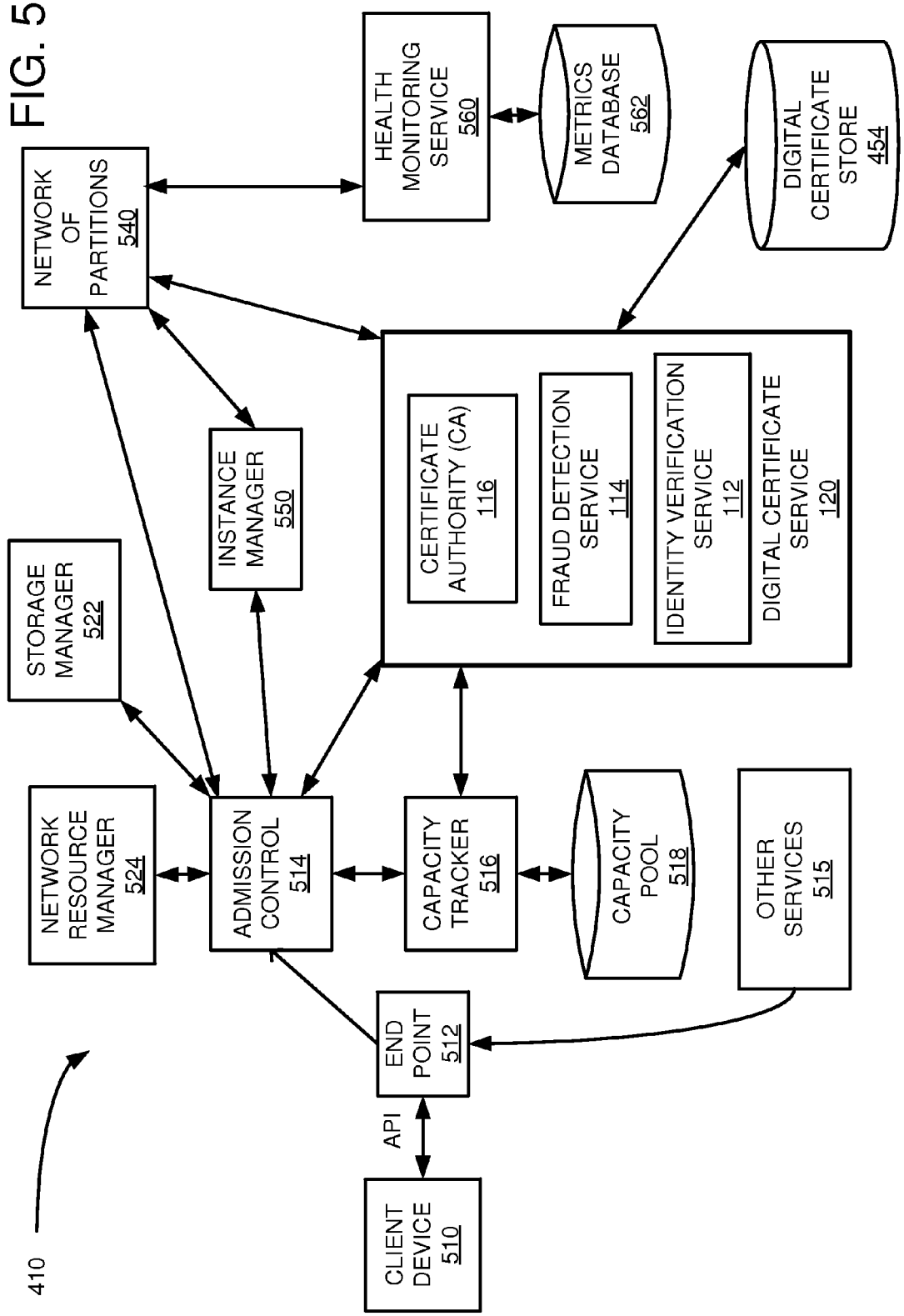
FIG. 5 shows further details of an example system including a plurality of management components associated with a control plane, which may be used to manage a digital certificate service according to one embodiment.

The digital certificate service 120 may be implemented as a stand-alone service within the provider 400, as a dedicated server (similar to the servers 402A-402D), and/or may be implemented as part of the server computer 404 that performs management functions. For example, the digital certificate service 120 may be implemented as part of the management component 410 (as seen in FIG. 5).

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 404 can be reserved for executing software components for managing the operation of the server computers 402, the instances 406, the hypervisors 408, and/or the digital certificate stores 416. For example, the server computer 404 can execute a management component 410. A customer can access the management component 410 to configure various aspects of the operation of the instances 406 purchased by the customer. For example, the customer can purchase, rent or lease instances and make changes to the configuration of the instances. The customer can also specify settings regarding how the purchased instances are to be scaled in response to demand. The management component 410 can further include a policy document to implement customer policies.

The server computer 404 may further comprise memory 452 and a digital certificate store 454. The memory 452 may be used as processing memory by the digital certificate service 120. The digital certificate store 454 may be used to store digital certificates (as explained above), as well as it may include one or more databases for storing and maintaining customer account information (e.g., authorization information used to authorize use/control of a network resource by a customer entity and/or authorization information used by the digital certificate service 120 to authorize customer entities for issuing digital certificates). The digital certificate store 454 may be implemented as part of the digital certificate service 550 and/or any of the other components of the server computer 404 (e.g., as part of the management component 410).

An auto scaling component 412 can scale the instances 406 based upon rules defined by the customer. In one embodiment, the auto scaling component 412 allows a customer to specify scale-up rules for use in determining when new instances should be instantiated and scale-down rules for use in determining when existing instances should be terminated. The auto scaling component 412 can consist of a number of subcomponents executing on different server computers 402 or other computing devices. The auto scaling component 412 can monitor available computing resources over an internal management network and modify resources available based on need.

A deployment component 414 can be used to assist customers in the deployment of new instances 406 of computing resources. The deployment component can have access to account information associated with the instances, such as who is the owner of the account, credit card information, country of the owner, etc. The deployment component 414 can receive a configuration from a customer that includes data describing how new instances 406 should be configured. For example, the configuration can specify one or more applications to be installed in new instances 406, provide scripts and/or other types of code to be executed for configuring new instances 406, provide cache logic specifying how an application cache should be prepared, and other types of information. The deployment component 414 can utilize the customer-provided configuration and cache logic to configure, prime, and launch new instances 406. The configuration, cache logic, and other information may be specified by a customer using the management component 410 or by providing this information directly to the deployment component 414. The instance manager can be considered part of the deployment component.

Customer account information 415 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, and so forth.

A network 430 can be utilized to interconnect the server computers 402A-402D and the server computer 404. The network 430 can be a local area network (LAN) and can be connected to a Wide Area Network (WAN) 440 so that end-users can access the compute service provider 400. It should be appreciated that the network topology illustrated in FIG. 4 has been simplified and that many more networks and networking devices can be utilized to interconnect the various computing systems disclosed herein.

FIG. 5 shows further details of an example system including a plurality of management components associated with a control plane, which may be used to manage a digital certificate service according to one embodiment. More specifically, FIG. 5 illustrates in further detail management component 410, which may implement the digital certificate service 120 and the digital certificate store 454 within the multi-tenant environment of the compute service provider 400.

In order to access and utilize instances (such as instances 406 of FIG. 4), a customer device can be used. The customer device 510 can be any of a variety of computing devices, mobile or otherwise, including a cell phone, smartphone, handheld computer, Personal Digital Assistant (PDA), desktop computer, etc. The customer device 510 can communicate with the compute service provider 400 through an end point 512, which can be a DNS address designed to receive and process application programming interface (API) requests. In particular, the end point 512 can be a web server configured to expose an API. Using the API requests (e.g., 108 in FIG. 1), a customer device 510 can make requests to implement any of the functionality described herein (e.g., request to authorize control, usage and/or payment for a network resource and/or issuing a digital certificate in connection with one or more network resources). Other services 515, which can be internal to the compute service provider 400, can likewise make API requests to the end point 512. For example, the customer device 510 may use the API requests (e.g., 108 in FIG. 1) to communicate a customer request for launching an instance and requesting a digital certificate associated with such instance.

Other general management services that may or may not be included in the compute service provider 400 (and/or within the management component 410) include an admission control 514, e.g., one or more computers operating together as an admission control web service. The admission control 514 can authenticate, validate and unpack the API requests for service or storage of data within the compute service provider 400. The capacity tracker 516 is responsible for determining how the servers need to be configured in order to meet the need for the different instance types by managing and configuring physical inventory in terms of forecasting, provisioning, and real-time configuration and allocation of capacity. The capacity tracker 516 maintains a pool of available inventory in a capacity pool database 518. The capacity tracker 516 can also monitor capacity levels so as to know whether resources are readily available or limited.

An instance manager 550 controls launching and termination of instances in the network. When an instruction is received (such as through an API request) to launch an instance, the instance manager 550 pulls resources from the capacity pool 518 and launches the instance on a decided upon host server computer. Similar to the instance manager are the storage manager 522 and the network resource manager 524. The storage manager 522 relates to initiation and termination of storage volumes, while the network resource manager 524 relates to initiation and termination of routers, switches, subnets, etc. A network of partitions 540 is described further in relation to FIG. 6 and includes a physical layer upon which the instances are launched.

The digital certificate service 120 may include an identity verification service 112, fraud detection service 114, and a CA 116, as explained herein. The digital certificate service 120 may communicate with the capacity tracker 516 to receive information regarding available partitions and/or host servers that can be used for launching an instance (or other network resources requested by a customer entity). Additionally, communications with the admission control 514 may be used to launch an instance, and communications with the network of partitions 540 may be used to push configuration changes as well as digital certificates onto hardware and/or software resources of the host servers in order to effectuate functionalities described herein (e.g., a digital certificate may be pushed to a corresponding server computer hosting the instance that is associated with the digital certificate, and then stored at the digital certificate store 416 at the corresponding server computer).

Figure 6:
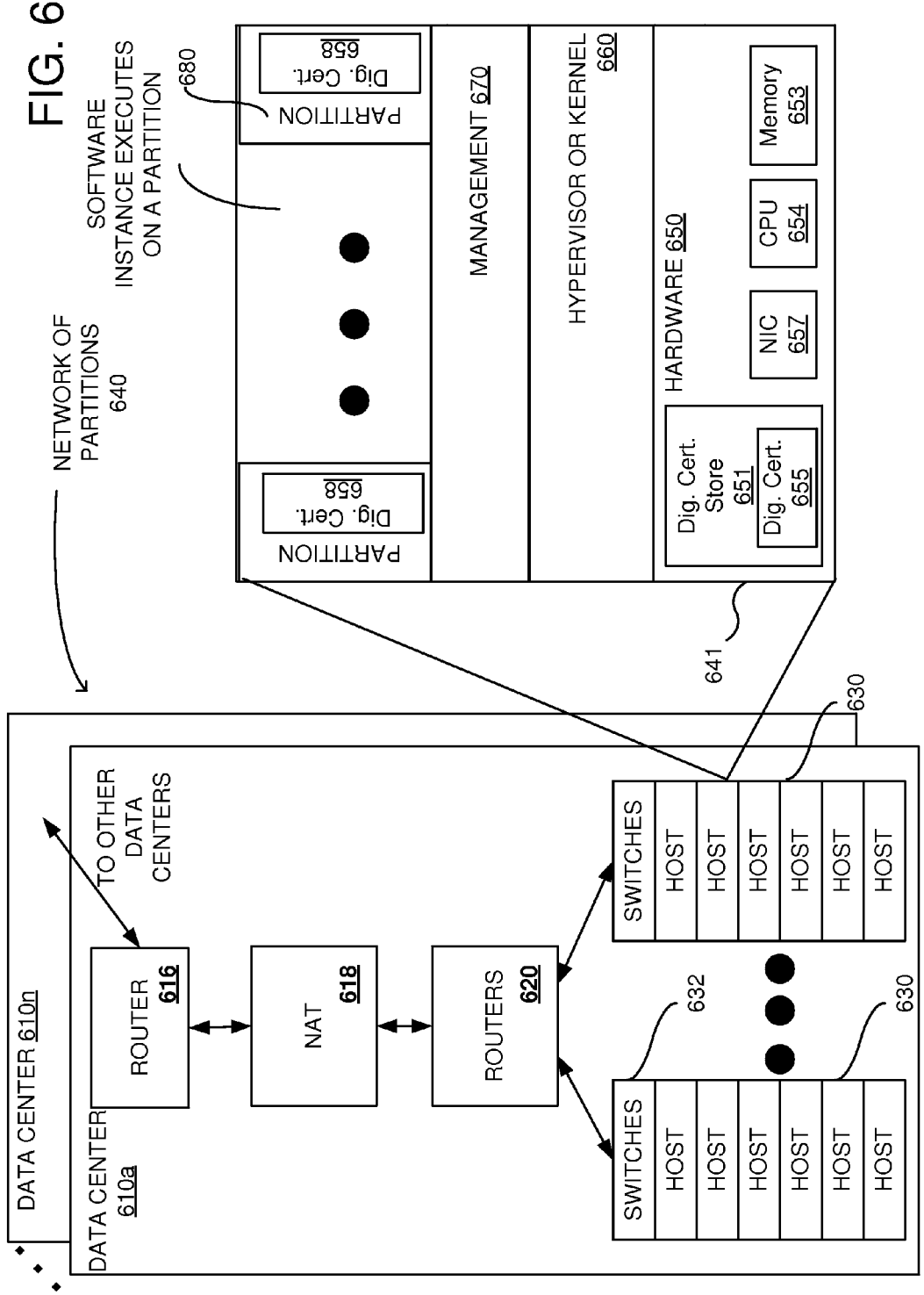
FIG. 6 shows an example of a plurality of host computers, routers, and switches—which are hardware assets used for running virtual machine instances—with the host computers having digital certificates-related functionalities that may be configured according to one embodiment.

FIG. 6 shows an example of a plurality of host computers, routers, and switches—which are hardware assets used for running virtual machine instances—with the host computers having digital certificates-related functionalities that may be configured according to one embodiment. More specifically, FIG. 6 illustrates the network of partitions 640 and the physical hardware associated therewith. The network of partitions 640 can include a plurality of data centers, such as data centers 610a, . . . , 610n, coupled together by routers, such as router 616.

The router 616 reads address information in a received packet and determines the packet's destination. If the router decides that a different data center contains a host server computer, then the packet is forwarded to that data center. If the packet is addressed to a host in the data center 610a, then it is passed to a network address translator (NAT) 618 that converts the packet's public IP address to a private IP address. The NAT 618 also translates private addresses to public addresses that are bound outside of the data center 610a. Additional routers 620 can be coupled to the NAT 618 to route packets to one or more racks 630 of host server computers. Each rack 630 can include a switch 632 coupled to multiple host server computers. A particular host server computer is shown in an expanded view at 641.

Each host 641 has underlying hardware 650 including a network interface card (NIC) 657, one or more CPUs (e.g., processor 654), memory (e.g., memory 653), a digital certificate store 651, etc. The digital certificate store 651 within the hardware layer 650 may be used for storing one or more digital certificates (e.g., 655) associated with one or more of the partitions 680.

Running a layer above the hardware 650 is a hypervisor or kernel layer 660. The hypervisor or kernel layer 660 can be classified as a type 1 or type 2 hypervisor. A type 1 hypervisor runs directly on the host hardware 650 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can also be used.

A management layer 670 can be part of the hypervisor or separated therefrom, and generally includes device drivers needed for accessing the hardware 650. The partitions 680 are logical units of isolation by the hypervisor. Each partition 680 can be allocated its own portion of the hardware layer's memory, CPU allocation, storage, etc. Additionally, each partition can include a virtual machine, its own guest operating system, and its digital certificate 658 (e.g., associated with the virtual machine running on the corresponding partition). As such, each partition 680 is an abstract portion of capacity designed to support its own virtual machine independent of the other partitions.

In accordance with an example embodiment of the disclosure, a digital certificate service (e.g., 550) may be used to implement functionalities related to provisioning of digital certificates as described herein.

Figure 7:
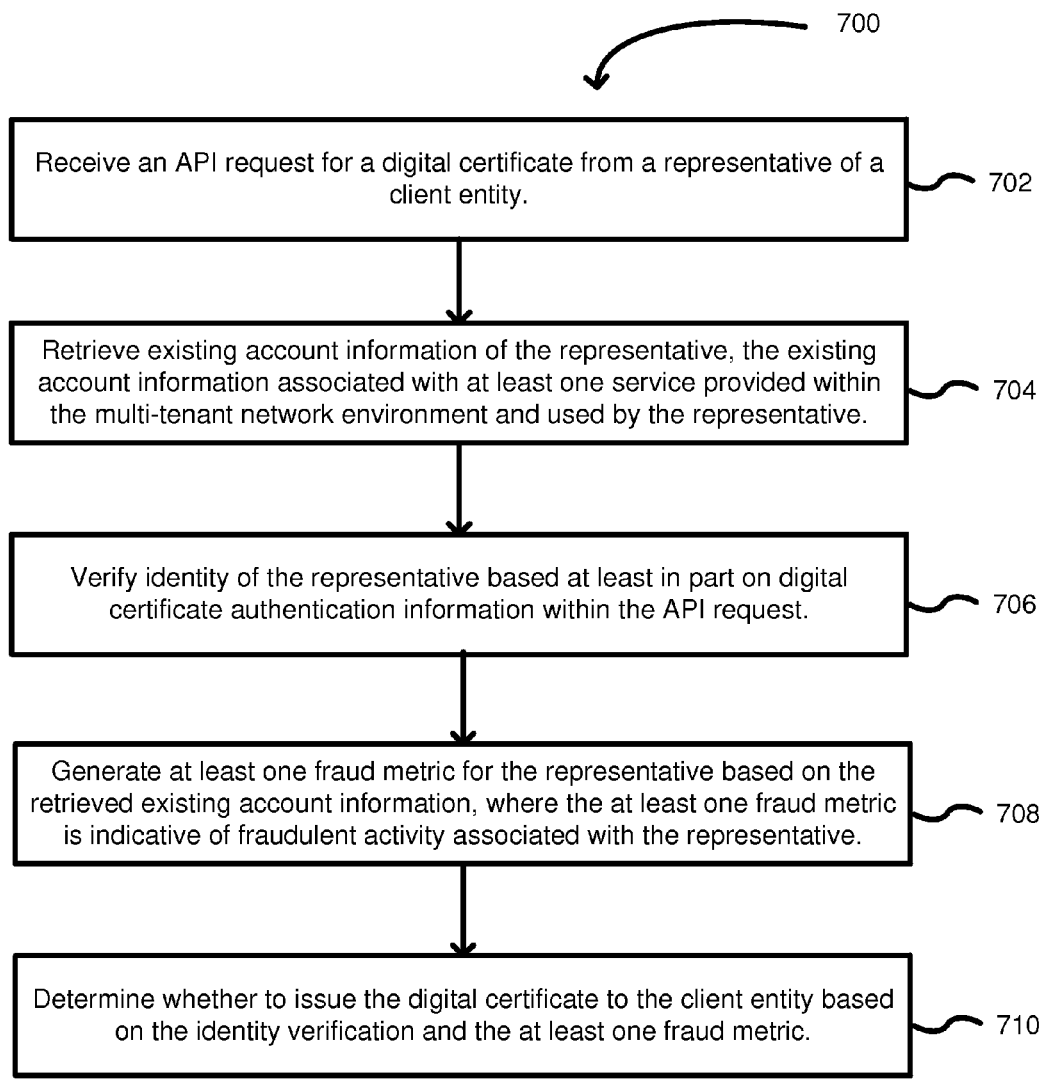
FIG. 7 is a flowchart of an example method for provisioning digital certificates in a multi-tenant network environment, in accordance with an embodiment of the disclosure.

FIG. 7 is a flowchart of an example method for provisioning digital certificates in a multi-tenant network environment, in accordance with an embodiment of the disclosure. Referring to FIGS. 1, 2, and 7, the example method 700 may start at 702, when an API request for a digital certificate may be received from a representative of a customer entity. For example, the CSP 110 may receive an API request 108 from the CR 106. The API request 108 may include CSR information 130, such as the public key 122, domain name 124, CR information 126, and/or CE information 128.

At 704, existing account information of the representative may be retrieved. For example, the fraud detection service 114 within the digital certificate service 120 may retrieve the existing account information (e.g., 113B) associated with at least one service provided within the multi-tenant network environment and used by the representative (CR 106). At 706, the identity of the representative and/or the customer entity 102 may be verified based at least in part on digital certificate authentication information within the API request. For example, the identity verification service 112 may verify/validate the identity of the CR 106 and/or the CE 102 using the CSR information 130 (e.g., verify customer entity 102 is registered at the corporate address provided with the digital certificate application, the customer entity 102 is the registered legal owner of the domain name 124 the digital certificate will be for, and so forth). The identity verification service 112 may also verify the representative (CR 106) is authorized to request the digital certificate for the domain name 124 on behalf of the customer entity (CE 102) by matching the information authenticating the representative within the multi-tenant network (e.g., an email for the CR 106 within the CR information 126) with the requested domain name 124.

At 708, at least one fraud metric may be generated for the representative and/or the customer entity 102 based on the retrieved existing account information. For example, the fraud detection service 114 may use the CSR information 130, account login information 202, email information 224, existing account information 113B, and/or other fraud related information 113A (e.g., information 208) to generate the at least one fraud metric (115) which is indicative of fraudulent activity associated with the representative and/or the customer entity 102. The fraud metric 115 may be generated based on matching data associated with the existing account information of the representative (113B) with one or both of the information authenticating the representative within the multi-tenant network environment (e.g., 202, 224) and the digital certificate authentication information (e.g., 130 or any information authenticating the CE 102).

At 710, the digital certificate service 120 may determine whether to issue the digital certificate to the customer entity based on the identity verification confirmation (111) and/or the at least one fraud metric (115). For example, the digital certificate service 120 may issue the digital certificate 103 to the customer entity 102 and or the CR 106, if the at least one fraud metric 115 is below a threshold value and the identity is verified. The digital certificate service 120 may decline to issue the digital certificate 103 to the customer entity 102 and or the CR 106, if the at least one fraud metric 115 is equal to or greater than the threshold value or the identity is not verified.

Figure 8:
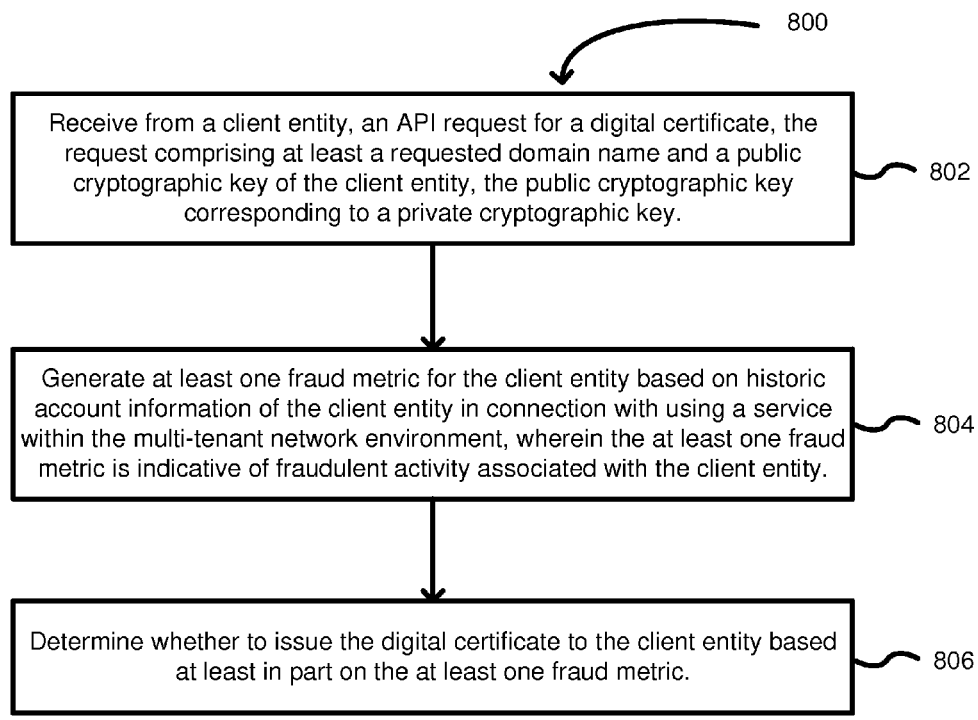
FIG. 8 is a flowchart of another example method for provisioning digital certificates, in accordance with an embodiment of the disclosure.

FIG. 8 is a flowchart of another example method for provisioning digital certificates, in accordance with an embodiment of the disclosure. Referring to FIGS. 1, 2, and 8, the example method 800 may start at 802, when an API request for a digital certificate may be received from a customer entity. For example, the CSP 110 may receive an API request 108 from the CR 106. The API request 108 may include CSR information 130, such as the public key 122, domain name 124, CR information 126, and/or CE information 128. The public cryptographic key 122 of the CE 102 may correspond to a private cryptographic key 104 kept by the CE 102.

At 804, at least one fraud metric may be generated for the customer entity based on historic account information of the customer entity in connection with using a service within the multi-tenant network environment. For example, the fraud detection service 114 may use the CSR information 130, account login information 202, email information 224, existing account information 113B, and/or other fraud related information 113A (e.g., information 208) to generate the at least one fraud metric (115) which is indicative of fraudulent activity associated with the customer entity 102. The fraud metric 115 may be generated based on matching data associated with the existing account information of the representative (113B) with one or both of the information authenticating the representative within the multi-tenant network environment (e.g., 202, 224) and the digital certificate authentication information (e.g., 130 or any information authenticating the CE 102).

At 806, it may be determined whether to issue the digital certificate to the customer entity based at least in part on the at least one fraud metric 115. For example, the digital certificate service 120 may issue the digital certificate 103 to the customer entity 102 and or the CR 106, if the at least one fraud metric 115 is below a threshold value. The digital certificate service 120 may decline to issue the digital certificate 103 to the customer entity 102 and or the CR 106, if the at least one fraud metric 115 is equal to or greater than the threshold value.

In some instances, the identity verification service 112 may also be used to verify/validate the identity of the CE 102 and/or the CR 106. For example, the identity verification service 112 may verify the identity of the customer entity 102 based at least in part on the requested domain name 124 and the public cryptographic key 122 of the customer entity. Verification of the identity may further include verifying a representative (e.g., CR 106) of the customer entity submitting the API request 108 is authorized to request the digital certificate for the domain name on behalf of the customer entity 102 and/or verifying the customer entity 102 has ownership control of the requested domain name 124.

The service provided by the CSP 110 may include, for example, a retail service, a cloud storage service or a payment service, and the historic account information 113B may include, for example, support request information, length of service usage information, location-based information, payment information, shipping information, and/or purchase information (as illustrated in detail in FIG. 2). The at least one fraud metric 115 may be indicative of fraudulent activity associated with the customer entity 102 in connection with previous use of the service within the multi-tenant network environment.

The API request 108 may be associated with information (e.g., 202 and/or 224 which may be communicated as part of CR information 126) authenticating a representative (CR 106) of the customer entity within the multi-tenant network environment for using the service.

The generating of the at least one fraud metric 115 by the fraud detection service 114 may further include matching data associated with the historic account information of the customer entity (e.g., 113B) with information authenticating the customer entity for using the at least one service within the multi-tenant network environment (e.g., CE information 128, which may include information 202 and/or 224).

Figure 9:
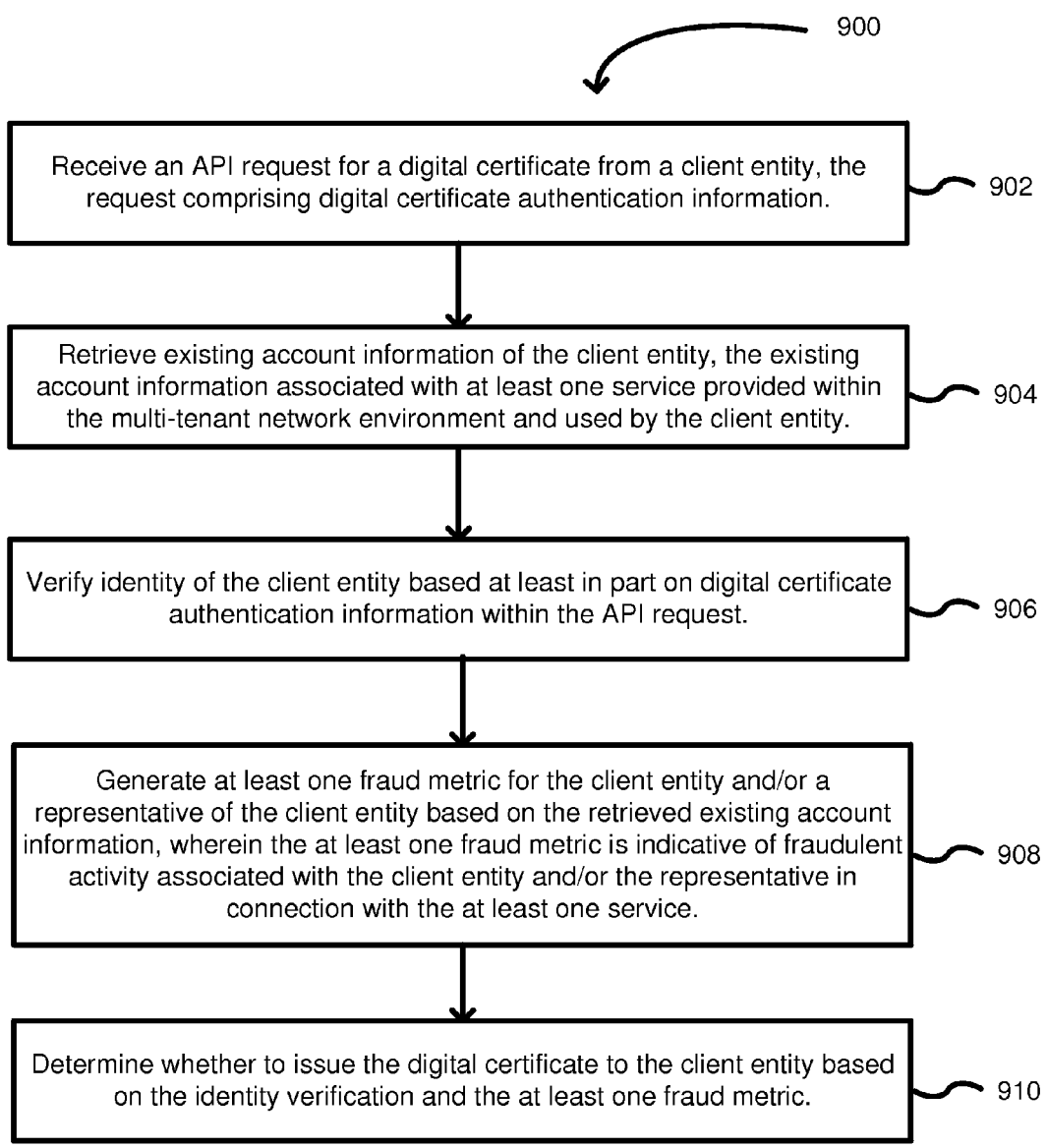
FIG. 9 is a flowchart of yet another example method for provisioning digital certificates in a compute service provider, in accordance with an embodiment of the disclosure.

FIG. 9 is a flowchart of yet another example method for provisioning digital certificates in a multi-tenant network environment, in accordance with an embodiment of the disclosure. Referring to FIGS. 1, 2, and 9, the example method 900 may start at 902, when an API request for a digital certificate may be received from a customer entity, the request including digital certificate authentication information. For example, the CSP 110 may receive an API request 108 from the CR 106. The API request 108 may include CSR information 130, such as the public key 122, domain name 124, CR information 126, and/or CE information 128.

At 904, existing account information of the customer entity may be retrieved. For example, the fraud detection service 114 within the digital certificate service 120 may retrieve the existing account information (e.g., 113B) associated with at least one service provided within the multi-tenant network environment and used by the customer entity (CE 102). At 906, the identity of the customer entity 102 may be verified based at least in part on digital certificate authentication information within the API request. For example, the identity verification service 112 may verify/validate the identity of the CE 102 using the CSR information 130 (e.g., verify customer entity 102 is registered at the corporate address provided with the digital certificate application, the customer entity 102 is the registered legal owner of the domain name 124 the digital certificate will be for, and so forth). The identity verification service 112 may also verify the representative (CR 106) is authorized to request the digital certificate for the domain name 124 on behalf of the customer entity (CE 102) by matching the information authenticating the representative within the multi-tenant network (e.g., an email for the CR 106 within the CR information 126) with the requested domain name 124.

At 908, at least one fraud metric may be generated for the customer entity based on the retrieved existing account information. For example, the fraud detection service 114 may use the CSR information 130, account login information 202, email information 224, existing account information 113B, and/or other fraud related information 113A (e.g., information 208) to generate the at least one fraud metric (115) which is indicative of fraudulent activity associated with the customer entity and/or the representative in connection with using at least one service provided within the multi-tenant environment. The fraud metric 115 may be generated based on matching data associated with the existing account information of the representative (113B) with one or both of the information authenticating the representative within the multi-tenant network environment (e.g., 202, 224) and the digital certificate authentication information (e.g., 130 or any information authenticating the CE 102).

At 910, the digital certificate service 120 may determine whether to issue the digital certificate to the customer entity based on the identity verification confirmation (111) and/or the at least one fraud metric (115). For example, the digital certificate service 120 may issue the digital certificate 103 to the customer entity 102 and or the CR 106, if the at least one fraud metric 115 is below a threshold value and the identity is verified. The digital certificate service 120 may decline to issue the digital certificate 103 to the customer entity 102 and or the CR 106, if the at least one fraud metric 115 is equal to or greater than the threshold value or the identity is not verified.

Figure 10:
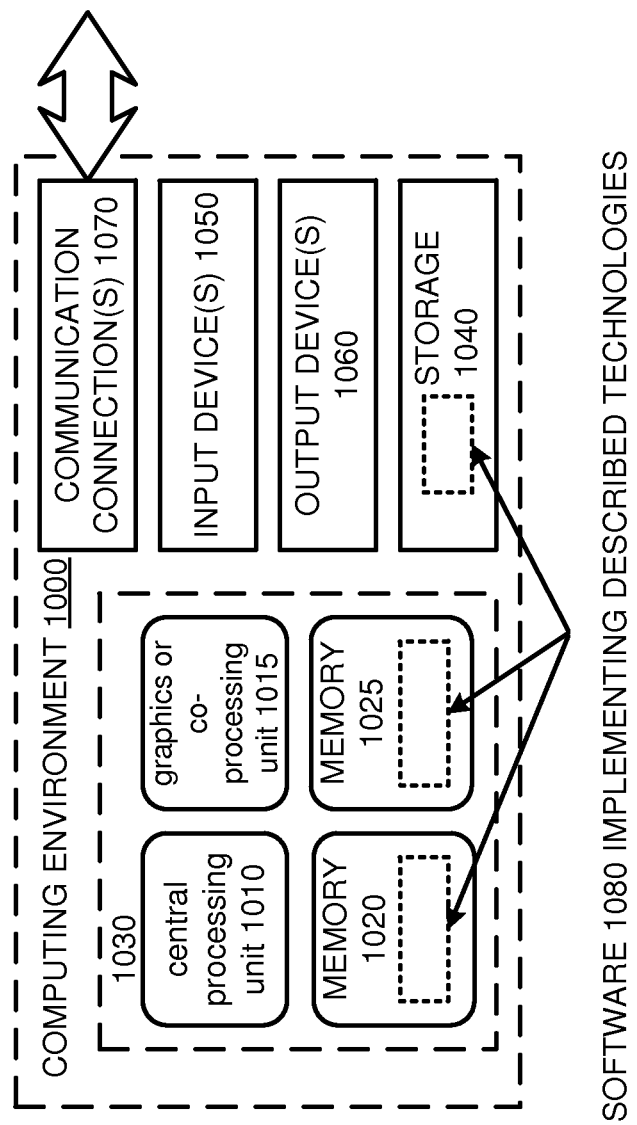
FIG. 10 depicts a generalized example of a suitable computing environment in which the described innovations may be implemented.

FIG. 10 depicts a generalized example of a suitable computing environment in which the described innovations may be implemented. Referring to FIG. 10, the computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations (e.g., functionalities) described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment

1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a customer-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A computer-readable storage medium storing computer-executable instructions for causing one or more computing devices to perform a method for provisioning digital certificates in a multi-tenant network environment, the method comprising:

receiving an API request for a digital certificate from a representative of a customer entity;

retrieving existing account information of the representative, the existing account information associated with at least one service provided within the multi-tenant network environment and used by the representative;

verifying identity of the representative and/or the customer entity based at least in part on digital certificate authentication information within the API request;

generating at least one fraud metric for the representative and/or the customer entity based on the retrieved existing account information, wherein the at least one fraud metric is indicative of fraudulent activity associated with the representative and/or the customer entity, and the generating of the at least one fraud metric is performed independently of verifying the identity and/or validating the representative and/or the customer entity; and determining whether to issue the digital certificate to the customer entity based on the identity verification and the at least one fraud metric.

2. The computer-readable storage medium according to claim 1, further including:

issuing the digital certificate to the customer entity, if the at least one fraud metric is below a threshold value and the identity is verified; and declining to issue the digital certificate, if the at least one fraud metric is equal to or greater than the threshold value or the identity is not verified.

3. The computer-readable storage medium according to claim 1, wherein the digital certificate authentication information within the API request is associated with:

at least a requested domain name and a public cryptographic key of the customer entity, the public cryptographic key corresponding to a private cryptographic key; and information authenticating the representative within the multi-tenant network environment for using the at least one service.

4. The computer-readable storage medium according to claim 3, wherein the verifying of the identity further includes:

verifying the representative is authorized to request the digital certificate for the domain name on behalf of the customer entity by matching the information authenticating the representative within the multi-tenant network with the requested domain name.

5. The computer-readable storage medium according to claim 3, wherein the generating of the at least one fraud metric further includes:

matching data associated with the existing account information of the representative with one or both of the information authenticating the representative within the multi-tenant network environment and the digital certificate authentication information.

6. The computer-readable storage medium according to claim 5, wherein the data associated with the existing account information of the representative comprises at least one of: purchase data, shipping data, payment data, and location-based data.

7. A method for provisioning digital certificates in a network environment, the method comprising:

receiving from a customer entity, an API request for a digital certificate;

generating at least one fraud metric for the customer entity based on historic account information of the customer entity in connection with using a service, wherein the at least one fraud metric is indicative of fraudulent activity associated with the customer entity and the generating of the at least one fraud metric is separate from validating the customer entity; and determining whether to issue the digital certificate to the customer entity based at least in part on a comparison of the at least one fraud metric with a threshold value.

8. The method according to claim 7, wherein the customer entity includes a representative of the customer entity and the method further comprises:

verifying identity of the customer entity based at least in part on a requested domain name.

9. The method according to claim 8, wherein the verifying of the identity further includes one or both of:

verifying a representative of the customer entity submitting the API request is authorized to request the digital certificate on behalf of the customer entity.

10. The method according to claim 8, comprising:

issuing the digital certificate to the customer entity, if the at least one fraud metric is below the threshold value and the identity is verified; and declining to issue the digital certificate, if the at least one fraud metric is equal to or greater than the threshold value or the identity is not verified.

11. The method according to claim 7, wherein the service comprises a retail service or a payment service and the historic account information comprises one or more of: location-based information, payment information, shipping information, and purchase information.

12. The method according to claim 7, wherein the service comprises a cloud storage service and the historic account information comprises support request information and length of service usage information.

13. The method according to claim 7, wherein the at least one fraud metric is indicative of fraudulent activity associated with the customer entity in connection with previous use of the service within the network environment.

14. The method according to claim 7, wherein:

the API request is associated with information authenticating a representative of the customer entity within the network environment for using the service; and the request comprises at least a requested domain name and a public cryptographic key of the customer entity, the public cryptographic key corresponding to a private cryptographic key.

15. The method according to claim 7, wherein the generating of the at least one fraud metric further includes:

matching data associated with the historic account information of the customer entity with information authenticating the customer entity for using the at least one service within the network environment.

16. The method according to claim 15, wherein the information authenticating the customer entity for using the at least one service comprises one or more of account user name, account password, and email information.

17. A network-based multi-tenant service that provides computing resources for provisioning digital certificates in a compute service provider, comprising:

one or more processors; and computer-readable memory storing instructions that are executable by the one or more processors to perform actions comprising:

receiving an API request for a digital certificate from a customer entity, the request comprising digital certificate authentication information;

retrieving existing account information of the customer entity, the existing account information associated with at least one service provided within the compute service provider and used by the customer entity;

validating and/or verifying identity of the customer entity based at least in part on digital certificate authentication information within the API request;

generating at least one fraud metric for the customer entity and/or a representative of the customer entity based on the retrieved existing account information, wherein the at least one fraud metric is indicative of fraudulent activity associated with the customer entity and/or the representative in connection with the at least one service, and the generating of the at least one fraud metric is performed independently of the validating and/or verifying the identity of the customer entity; and determining whether to issue the digital certificate to the customer entity based on the identity verification and the at least one fraud metric.

18. The network-based multi-tenant service of claim 17, wherein the digital certificate authentication information within the API request is associated with:

at least a requested domain name and a public cryptographic key of the customer entity, the public cryptographic key corresponding to a private cryptographic key; and information authenticating the representative within the multi-tenant network environment for using the at least one service.

19. The network-based multi-tenant service of claim 17, further including:

issuing the digital certificate to the customer entity, if the at least one fraud metric is below a threshold value and the identity is verified; and declining to issue the digital certificate, if the at least one fraud metric is equal to or greater than the threshold value or the identity is not verified.

20. The network-based multi-tenant service of claim 17, wherein the existing account information of the customer entity comprises at least one of: purchase data, shipping data, payment data, and location-based data.

* * * * *